United States Patent [19]

Suzuki

[11] Patent Number: 5,262,634
[45] Date of Patent: Nov. 16, 1993

[54] OPTICAL SENSOR UNIT USING MULTIPLE ELASTIC RETAINERS

[75] Inventor: Kazuhiro Suzuki, Hadano, Japan

[73] Assignee: Stanley Electric Co., Ltd., Tokyo, Japan

[21] Appl. No.: 950,245

[22] Filed: Sep. 24, 1992

[30] Foreign Application Priority Data

Sep. 25, 1991 [JP] Japan ............................ 3-085358[U]

[51] Int. Cl.⁵ ............................................ H01J 40/14
[52] U.S. Cl. .................................. 250/208.1; 257/443
[58] Field of Search ........................ 250/208.1, 214.1; 257/443; 358/474, 482, 483; 437/216, 223, 222, 221

[56] References Cited

U.S. PATENT DOCUMENTS 4,570,076  2/1986  Hamano et al. ............... 250/208.1
4,695,715  9/1987  Malm ............................... 250/208.1

Primary Examiner—David C. Nelms
Assistant Examiner—K. Shami
Attorney, Agent, or Firm—Fish & Richardson

[57] ABSTRACT

A plurality of CCD sensors are arranged whose respective light receiving portions form a line sensor of a single straight line on a plurality of ceramic substrates. The plurality of ceramic substrates are arranged on the frame such that one end portions of respective elastic elements are in contact with the longitudinally opposed side edges of the ceramic substrates, and the other end portions are fixedly mounted on the frame. When the frame expands or contracts due to a change in circumferential temperature so that displacement in the longitudinal direction occurs, the one end portions of the elastic elements slide on the edge parts of the ceramic substrates. That is, deformation in the longitudinal direction of the frame is not transmitted directly to the ceramic substrates. Thus, it is possible to prevent space or interval slippage on a straight line from occurring between the plurality of CCD sensors.

8 Claims, 4 Drawing Sheets

OPTICAL SENSOR UNIT USING MULTIPLE ELASTIC RETAINERS

BACKGROUND OF THE INVENTION

1. Field of the Invention

The present invention relates to an optical sensor unit which is utilized for a picture processing apparatus such as a scanner or the like and in which a plurality of light receiving sections of respective CCD sensors are arranged in a manner of a straight line so that the picture processing apparatus is used as a line sensor.

2. Prior Art of the Invention

Conventionally, in a line sensor utilized in a scanner or the like of a picture processing apparatus, it has been requested to read a manuscript or a copy which is wide in width in recent years. An optical system which reads the manuscript utilizes a CCD which executes photoelectric transferring of an incident light which has read the manuscript. Under the present condition, it has been difficult to manufacture a single CCD capable of reading the manuscript wide in width, easily and at a low cost. In order to magnify or enlarge the reading width, a line sensor has been utilized in which a plurality of CCD sensors are used, and light receiving sections thereof are arranged in a single row.

FIG. 8 of the attached drawings shows a cross-sectional arrangement of an optical sensor unit that is the above-described line sensor.

As shown in FIG. 8, an optical sensor unit 1 comprises an elongated frame 2 for being mounted on an apparatus (not shown), a plurality of CCD sensors 3 whose respective light receiving sections are arranged in a single straight line, and ceramic substrates 4 on which the CCD sensors 3 are arranged and which is fixedly mounted along a longitudinal direction of the frame 2. In this case, the plurality of ceramic substrates 4 are arranged on and fixedly mounted on the frame 2 so that the plurality of light receiving sections of the respective CCD sensors 3 are arranged in a single straight line. Thus, a single line sensor is formed.

With the above-described arrangement, it is difficult for the ceramic substrates 4 to process the same for being mounted on the apparatus (not shown). For this reason, the ceramic substrates 4 have been arranged on the frame 2 which uses a metal material such as an aluminum or the like which is relatively easy in processing for being incorporated into the apparatus (not shown). Further, the CCD sensors 3 are arranged on the ceramic substrates 4 and are fixedly mounted thereon. In this case, the ceramic substrates 4 and the frame 2 are bonded or adhered to each other by adhesives 5 and are fixedly mounted to each other by the adhesives 5.

However, for the optical sensor unit 1 arranged as described above, the frame 2 and the ceramic substrates 4 are different in coefficient of thermal expansion from each other, and the frame 2 expands or contracts by a change in circumferential temperature so that a stress is generated with respect to the ceramic substrates 4. For this reason, spaces or intervals between the plurality of CCD sensors 3 arranged in one straight line shift from each other.

By the way, spaces or intervals between the picture elements of the CCD sensors 3 are approximately 20 μm. In a case where the light receiving sections of the plurality of CCD sensors 3 are arranged on the frame 2 so as to be brought to one straight line to form a line sensor, displacement of the light receiving sections with respect to a light incident direction does not come into question. However, positional shift in one straight line of the light receiving sections of the plurality of CCD sensors 3 comes into question. That is, the intervals between the plurality of CCD sensors 3 shift slightly so that discontinuous portions occur on the way of reading information of one line.

As described above, the conventional optical sensor unit has a problem that the frame 2 expands or contracts by the change in circumferential temperature so that a stress occurs with respect to the ceramic substrates 4. Thus, it is impossible to accurately detect the incident light by the shift which occurs due to the stress.

SUMMARY OF THE INVENTION

In view of the above, it is an object of the invention to provide an optical sensor unit in which a plurality of light receiving sections of CCD sensors are arranged in a single straight line, in which, even in a case where a change in temperature occurs, positional shift between the plurality of CCD sensors can be prevented from occurring, and in which it is possible to accurately detect an incident light without occurrence of discontinuous portions on the way of reading information with respect to a single line.

In order to achieve the above-described object, an optical sensor unit according to the invention comprises an elongated frame, a plurality of ceramic substrates arranged on the frame along a longitudinal direction thereof, a plurality of CCD sensors arranged respectively on the plurality of ceramic substrates and having respective light receiving sections thereof which are arranged on a single straight line to form a line sensor, and a plurality of elastic elements having respective one ends thereof in pressing contact with longitudinally opposed side edges of the plurality of ceramic substrates and the other ends fixedly mounted on the frame.

Secondly, the plurality of elastic elements include the total sum of two (2) elastic elements such that the two elastic elements are arranged between the frame and the longitudinally opposed side edges of the single ceramic substrate.

Thirdly, the plurality of elastic elements include the total sum of four (4) elastic elements such that the four elastic elements are arranged in spaced relation to each other between the frame and the longitudinally opposed side edges of the single ceramic substrate.

Fourthly, a mounting element is provided which has one end thereof mounted on a central portion of the frame and the other end mounted on a mounting objective element for arranging the sensor unit, and that the frame is rotatively moved so that light receiving portions of the plurality of CCD sensors and an incident light are aligned with each other, in addition to each of these first to third arrangements.

Fifthly, an optical sensor unit comprises an elongated frame, a plurality of metal brackets arranged on the frame along a longitudinal direction thereof, a plurality of ceramic substrates arranged respectively on the plurality of metal brackets along longitudinal directions thereof and having respective coefficients of thermal expansion thereof substantially the same as those of the metal brackets, a plurality of CCD sensors arranged respectively on the plurality of ceramic substrates and having respective light receiving sections thereof which are arranged on a single straight line to form a line sensor, and a plurality of elastic elements having respective one ends thereof in pressing contact with longitudinally opposed side edges of the plurality of metal brackets and the other ends fixedly mounted on the frames.

Sixthly, the plurality of elastic elements are a total sum of two in which the elastic elements are arranged between the frame and longitudinally opposed respective side edges of one metal bracket.

Seventh, the plurality of elastic elements are arranged by a total sum of four (4) in which the four elastic elements are arranged in spaced relation to each other between the frame and longitudinally opposed respective side edges of one metal bracket.

Eighth, a mounting element is provided which has one end thereof mounted on a central portion of the frame and the other end mounted on a mounting objective element for arranging the sensor unit, and that the frame is rotatively moved so that light receiving portions of the plurality of CCD sensors and an incident light are aligned with each other, in addition to each of these fifth to seventh arrangements.

In the optical sensor unit according to the invention arranged as described above, the plurality of CCD sensors whose respective light receiving sections form a line sensor arranged in a single straight line are arranged. The plurality of ceramic substrates on which the CCD sensors are arranged respectively are arranged such that the resilient or elastic elements have one ends thereof in contact with the side edges of the ceramic substrates opposed longitudinally, and the other ends of the elastic elements are fixedly arranged on the frame.

Accordingly, when the frame expands or contracts by a change in circumferential temperature so that displacement occurs in the longitudinal direction, the one ends of the elastic elements slide on edge parts of the ceramic substrates. That is, the displacement in the longitudinal direction of the frame is not directly transmitted to the ceramic substrates, and the positional shift on a single straight line between the plurality of CCD sensors can be prevented from occurring. For this reason, in a case where the circumferential temperature changes, discontinuous portions do not occur on the way of reading information of one line. Thus, it is possible to accurately detect the incident light.

Further, the plurality of CCD sensors are arranged respectively on the metal brackets and on the plurality of ceramic substrates which are substantially the same in coefficient of thermal expansion as the frame and which are bonded to the frame by adhesives. The metal brackets are arranged such that one ends of the elastic elements are in contact with the side edges of the metal brackets opposed longitudinally, and the other ends are fixedly mounted on the frame and are arranged thereon.

Accordingly, when the frame expands or contracts due to the change in circumferential temperature so that longitudinal displacement occurs, the one ends of the elastic elements slide on the edge parts of the metallic brackets. That is, deformation in the longitudinal direction of the frame is not directly transmitted to the metal brackets, and the positional shift between the plurality of CCD sensors on the one straight line is prevented from occurring. For this reason, even in a case where the circumference temperature changes, discontinuous portions on the way of reading information of one line do not occur so that the incident light can accurately be detected.

DESCRIPTION OF THE EMBODIMENTS

Various embodiments of an optical sensor unit according to the invention will next be described in detail with reference to the accompanying drawings.

An arrangement of a first embodiment according to the invention will first be described.

Figure 1:
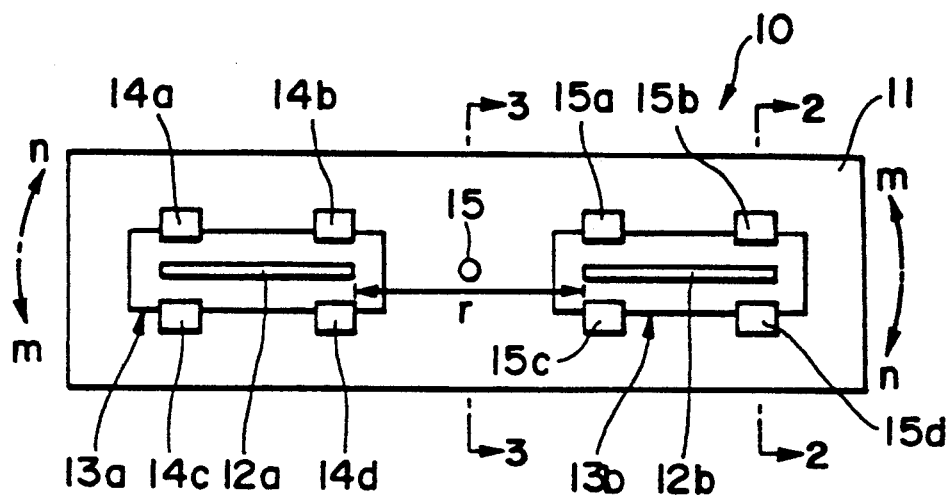
FIG. 1 is a top plan view showing an arrangement of a first embodiment of an optical sensor unit according to the invention.
Figure 2:
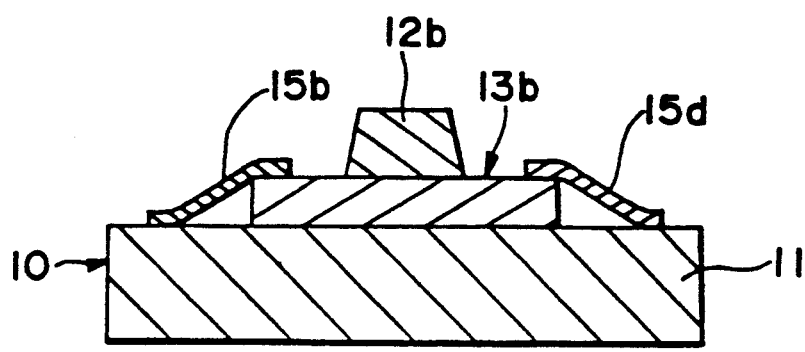
FIG. 2 is a cross-sectional view taken along a line A—A in FIG. 1.

Referring first to FIG. 1 and 2, an optical sensor unit 10 comprises an elongated frame 11 to which processing for being mounted on an apparatus (not shown) is subjected by the use of an aluminum material, a pair of CCD sensors 12a and 12b whose space or interval is r and whose respective light receiving sections are arranged in a single straight line, and a pair of ceramic substrates 13a and 13b arranged along a longitudinal direction of the frame 11 and in which light receiving portions of the respective CCD sensors 12a and 12b are arranged in the signal straight line.

Further, the optical sensor unit 10 is provided with retainer springs 14a, 14b, 14c and 14d to which one ends of the respective retainer springs 14a, 14b, 14c and 14d adjacent to the frame 11 are fixedly mounted on the frame 11 by spot welding or the like, in order to weight or press and retain, with elasticity, four (4) locations including edge parts of the ceramic substrate 13a on longitudinal both sides, and retainer springs 15a, 15b, 15c and 15d by which one ends of the respective retainer springs 15a, 15b, 15c and 15d adjacent to the frame 11 are fixedly mounted on the frame 11 by spot welding or the like, in order for four (4) locations including edge parts of the ceramic substrate 13a in the longitudinal direction to be weighted and retained with resiliency.

With the arrangement described above, a line sensor is formed in which light receiving portions of the CCD sensors 12a and 12b are arranged in a single straight line.

Figure 3:
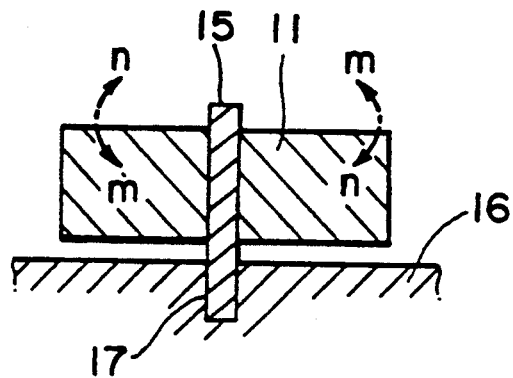
FIG. 3 is a cross-sectional view taken along a line B—B in FIG. 1.

Further, as shown in FIG. 3, a columnar mounting pin 15 for being mounted on the apparatus equipped with the optical sensor unit 10 is arranged at a center of the frame 11. The mounting pin 15 has one end thereof which is mounted in insertion on a through bore in the frame 11. Furthermore, the other end of the mounting pin 15 is mounted in insertion on a mounting bore 17 which is provided in a mounting portion 16 such as the apparatus.

With the above arrangement, the frame 11 can be rotated about the mounting pin 15. In this connection, in the first embodiment, the end of the mounting pin 15 is mounted on an element of the frame 11 so as to penetrate or extend therethrough. However, the arrangement may be such that a bag bore is provided through which the mounting pin 15 cannot punch or cannot extend, and the end of the mounting pin 15 is inserted into the bag bore.

Function and operation of the arrangement of the first embodiment will next be described.

An incident light read by an optical system (not shown), and spectro-divided into two, for example, is incident upon the light receiving portions of the CCD sensors 12a and 12b. In this case, the optical sensor unit 10 is aligned with an inclination of a straight line which connects centers of the respective incident lights spectro-divided into two to each other. That is, the frame 11 is rotated in directions indicated by arrows m and n in FIGS. 1 and 3 about the mounting pin 15 in order to align a straight line connecting the centers of the light receiving portions of the respective CCD sensors 12a and 12b to each other, with the incident light.

A case where the circumferential temperature about the optical sensor unit 10 changes will next be described.

Four (4) locations of the edge parts of the ceramic substrate 13a in the longitudinal direction, on which the CCD sensor 12a is arranged, are held and retained with elasticity by the retainer springs 14a ~ 14d. Similarly, four (4) locations of the edge parts of the ceramic substrate 13b in the longitudinal direction, on which the CCD sensor 12b is arranged, are held and retained with elasticity by the retainer springs 15a ~ 15d. In this case, the ceramic substrates 13a and 13b are free to move longitudinally with respect to the frame 11.

Accordingly, in a case where the frame 11 expands or contracts by a change in circumferential temperature so that the frame 11 is deformed longitudinally, displacement due to the deformation slides between the retainer springs 14a ~ 14d and 15a ~ 15d and the edge parts of the ceramic substrates 13a and 13b which are in contact with one ends of the springs 14a ~ 14d and 15a ~ 15d. That is, deformation of the frame 11 in the longitudinal direction is not transmitted directly to the ceramic substrates 13a and 13b. Accordingly, shift in the interval r between the CCD sensor 12a and the CCD sensor 12b does not occur.

Accordingly, discontinuous portions do not occur on the way of the reading information on one line by the CCD sensors 12a and 12b. Thus, it is possible to execute precise or accurate detection of the incident light.

A second embodiment of the invention will next be described.

The above-described first embodiment is arranged such that the four (4) locations of the longitudinal edge parts of the ceramic substrate 13a illustrated in FIG. 1 are retained and held with elasticity by the retainer springs 14a ~ 14d, respectively, and the four (4) locations of the edge parts of the ceramic substrate 13b in the longitudinal direction are held and retained with elasticity by the retainer springs 15a ~ 15d, respectively. That is, the sum total of eight (8) retainer springs 14a ~ 14d and 15a ~ 15d is used. In the second embodiment, however, only a total sum of four (4) retainer springs 18a and 18b, and 19a and 19b wide in width is used so that an arrangement thereof is simplified.

Figure 4:
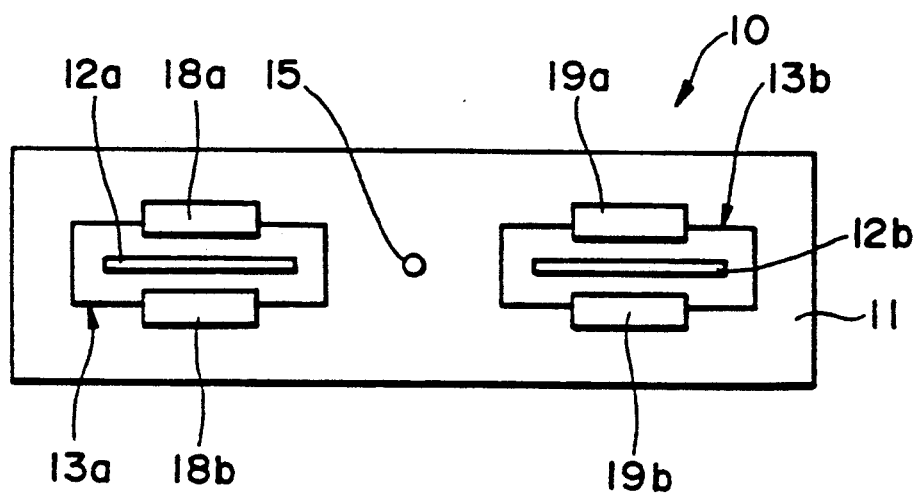
FIG. 4 is a top plan view showing an arrangement of a second embodiment of the invention.

As shown in FIG. 4, the retainer springs 18a and 18b have respective one ends thereof which are in contact with two (2) locations of opposed longitudinal edge parts of a ceramic substrate 13a, while the other ends of the respective retainer springs 18a and 18b are fixedly mounted on a frame 11 by spot welding. That is, the ceramic substrate 13a is retained so as to be pressed down or held down with elasticity by the two retainer springs 18a and 18b.

Moreover, a ceramic substrate 13b is also similar to the above. The retainer springs 19a and 19b have respective one ends thereof which are in contact with two (2) locations of opposed longitudinal edge parts of the ceramic substrate 13b, while the other end portions of the respective retainer springs 19a and 19b are fixedly mounted on the frame 11 by spot welding. That is, the ceramic substrate 13b is pressed down or held down with elasticity by the retainer springs 19a and 19b. Other arrangement is similar to that of the first embodiment. Function and operation of the arrangement according to the second embodiment are similar to those of the arrangement according to the first embodiment.

A third embodiment of the invention will next be described.

Figure 5:
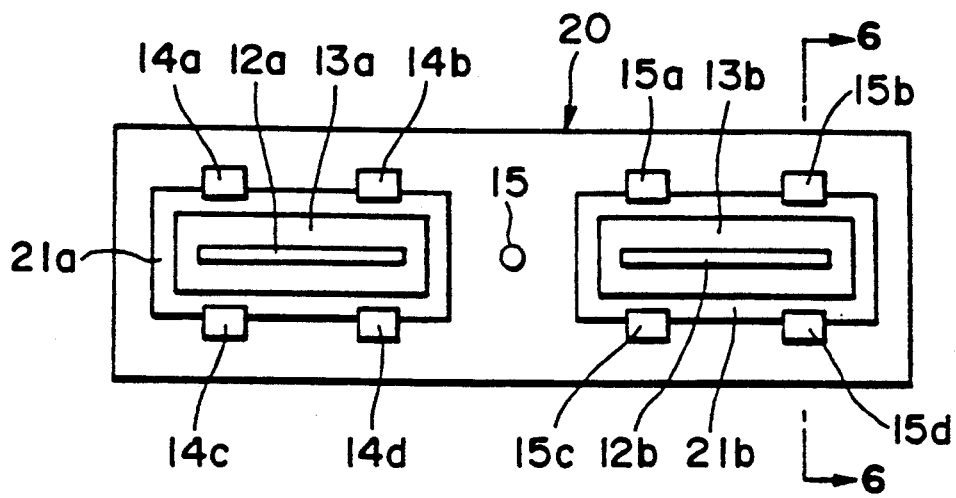
FIG. 5 is a top plan view showing an arrangement of a third embodiment of the invention.
Figure 6:
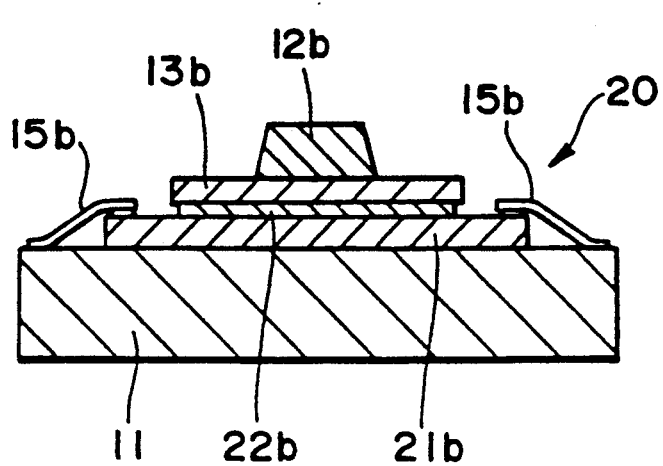
FIG. 6 is a cross-sectional view taken along a line C—C in FIG. 5.

As shown in FIGS. 5 and 6, an optical sensor unit 20 is arranged such that a ceramic substrate 13a is fixedly adhered, by adhesives (not shown), to a metal bracket 21a having substantially the same coefficient of thermal expansion as the ceramic substrate 13a on which a CCD sensor 12a is arranged.

Moreover, a ceramic substrate 13b is fixedly adhered, by adhesives 22b, to a metal bracket 21b having substantially the same coefficient of thermal expansion as the ceramic substrate 13b on which a CCD sensor 12b is arranged.

Four (4) locations of longitudinal edge parts of the respective metal brackets 21a and 21b are fixedly pressed down or held down with elasticity by retainer springs 14a ~ 14d and 15a ~ 15d. Other arrangement is similar to that of the first embodiment.

Figure 8:
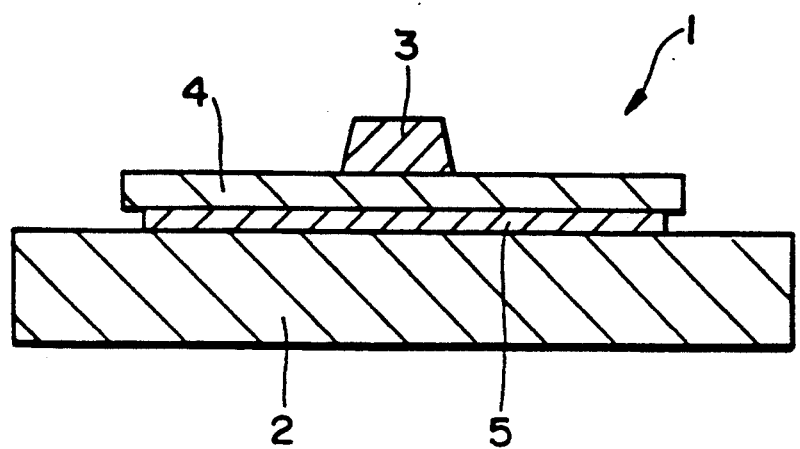
FIG. 8 is a schematic cross-sectional view showing an arrangement of an optical sensor unit according to a conventional example.

The arrangement utilizing the metal brackets 21a and 21b is similar to the conventional arrangement illustrated in FIG. 8, and has advantages utilizing the conventional manufacturing step and the like.

A fourth embodiment of the invention will next be described.

Figure 7:
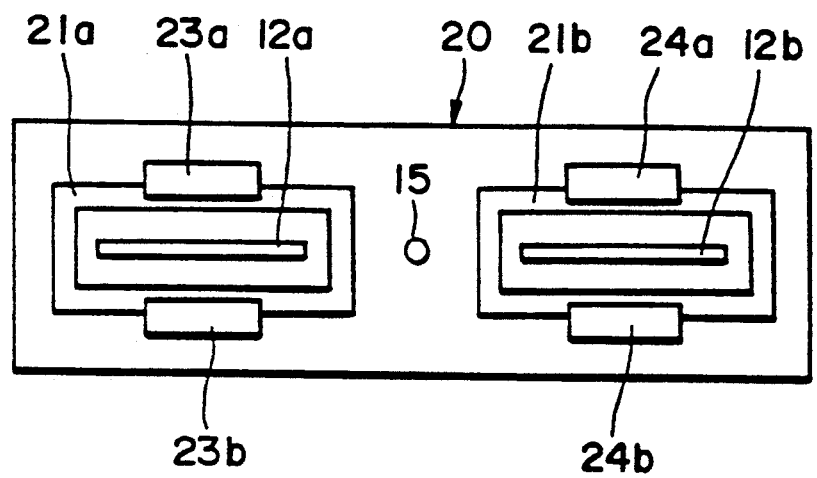
FIG. 7 is a top plan view showing an arrangement of a fourth embodiment of the invention.

In the previous third embodiment, a sum total of eight (8) retainer springs 14a ~ 14d and 15a ~ 15d is used to press the metal brackets 21a and 21b down with elasticity and to fixedly retain the latter, similarly to the first embodiment. In the fourth embodiment, however, only a sum total of four (4) retainer springs 23a and 23b, and 24a and 24b wide in width is used so that an arrangement thereof is simplified. That is, as shown in FIG. 7, a metal bracket 21a is arranged such that retainer springs 23a and 23b have respective one ends thereof which are in contact with two (2) locations of opposed longitudinal edge portions of the metal bracket 21a. The other ends of the respective retainer springs 23a and 23b are fixedly mounted on a frame 11 by spot welding or the like so that the other ends are arranged on the frame 11.

Further, the retainer springs 24a and 24b have respective one ends thereof which are in contact with two (2) locations of opposed longitudinal edge parts by a metal bracket 21b. The other ends of the respective retainer springs 24a and 24b are fixedly mounted on the frame 11 by spot welding. Thus, the metal bracket 21b is arranged on the frame 11.

That is, ceramic substrates 13a and 13b are pressed down and retained with elasticity by the two retainer springs 23a and 23b, and 24a and 24b.

As described above, according to the optical sensor unit of the invention, the plurality of CCD sensors are arranged whose light receiving portions form the line sensor in a straight line sensor. The plurality of ceramic substrates on which the CCD sensors are arranged on the frame such that one ends of the elastic elements are in contact with the opposed longitudinal side edges of the ceramic substrates, while the other ends of the elastic elements are fixedly mounted on the frame.

Accordingly, when the frame expands and contacts due to a change in circumferential temperature so that displacement occurs in the longitudinal direction of the ceramic substrates, the one ends of the elastic elements slide on the edge parts of the ceramic substrates. That is, the longitudinal deformation of the frame is not transmitted directly to the ceramic substrates. Thus, it is possible to prevent shift in position on the straight line between the plurality of CCD sensors from occurring. For this reason, in a case where the circumferential temperature changes, no discontinuous portions occur on the way of reading information of one line. Thus, there are produced advantages that it is possible to accurately detect the incident light.

Furthermore, the plurality of CCD sensors are arranged respectively on the plurality of metal brackets and on the plurality of ceramic substrates which are bonded to the frame by the adhesives and which are substantially the same in coefficient of thermal expansion as each other. The metal brackets are arranged on the frame such that the one ends of the elastic elements are in contact with or abutted against the opposed longitudinal side edges of the metal brackets, and the other ends are fixedly mounted on the frame.

Accordingly, when the frame expands or contracts by the change in circumferential temperature so that displacement in the longitudinal direction occurs, the one ends of the elastic elements slide on the edge parts of the metal brackets. That is, deformation of the frame in the longitudinal direction is not directly transmitted to the metal brackets. Thus, positional shift between the plurality of CCD sensors on the single straight line can be prevented from occurring. For this reason, even in a case where the circumferential temperature changes, no discontinuous portions occur on the way of reading information of one line. Thus, there are produced advantages that it is possible to accurately detect the incident light.

What is claimed is:

1. An optical sensor unit comprising an elongated frame, a plurality of ceramic substrates arranged on said frame along a longitudinal direction thereof, a plurality of CCD sensors arranged respectively on said plurality of ceramic substrates and having respective light receiving sections thereof which are arranged on a single straight line to form a line sensor, and a plurality of elastic elements having respective one ends thereof joined with elasticity to longitudinally opposed side edges of the plurality of ceramic substrates and the other ends fixedly mounted on said frame.

2. An optical sensor unit according to claim 1, characterized in that said plurality of elastic elements include the total sum of two (2) elastic elements such that the two elastic elements are arranged between the frame and the longitudinally opposed side edges of the single ceramic substrate.

3. An optical sensor unit according to claim 1, characterized in that said plurality of elastic elements include the total sum of four (4) elastic elements such that the four elastic elements are arranged in spaced relation to each other between the frame and the longitudinally opposed side edges of the single ceramic substrate.

4. An optical sensor unit according to claim 1, 2 or 3, characterized further in that a mounting element is provided which has one end thereof mounted on a central portion of the frame and the other end mounted on a mounting objective element for arranging said sensor unit, and that said frame is rotatively moved so that light receiving portions of the plurality of CCD sensors and an incident light are aligned with each other.

5. An optical sensor unit comprising an elongated frame, a plurality of metal brackets arranged on said frame along a longitudinal direction thereof, a plurality of ceramic substrates arranged respectively on said plurality of metal brackets along longitudinal directions thereof and having respective coefficients of thermal expansion thereof substantially the same as those of said metal brackets, a plurality of CCD sensors arranged respectively on said plurality of ceramic substrates and having respective light receiving sections thereof which are arranged on a single straight line to form a line sensor, and a plurality of elastic elements having respective one ends thereof joined with elasticity to longitudinally opposed side edges of the plurality of metal brackets and the other ends fixedly mounted on said frames.

6. An optical sensor unit according to claim 5, characterized in that said plurality of elastic elements are a total sum of two in which the elastic elements are arranged between said frame and longitudinally opposed respective side edges of one metal bracket.

7. An optical sensor unit according to claim 5, characterized in that said plurality of elastic elements are arranged by a total sum of four (4) in which the four elastic elements are arranged in spaced relation to each other between said frame and longitudinally opposed respective side edges of one metal bracket.

8. An optical sensor unit according to claim 5, 6 or 7, characterized further in that a mounting element is provided which has one end thereof mounted on a central portion of the frame and the other end mounted on a mounting objective element for arranging said sensor unit, and that said frame is rotatively moved so that light receiving portions of the plurality of CCD sensors and an incident light are aligned with each other.

* * * * *